(12) United States Patent
Karikomi

(10) Patent No.: US 11,519,388 B2
(45) Date of Patent: Dec. 6, 2022

(54) SEMI-SUBMERSIBLE TYPE FLOATING SUBSTRUCTURE AND WIND TURBINE OFFSHORE INSTALLATION METHOD USING SEMI-SUBMERSIBLE TYPE FLOATING SUBSTRUCTURE

(71) Applicant: MITSUBISHI HEAVY INDUSTRIES, LTD., Tokyo (JP)

(72) Inventor: Kai Karikomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 322 days.

(21) Appl. No.: 16/783,255

(22) Filed: Feb. 6, 2020

(65) Prior Publication Data

US 2020/0325877 A1    Oct. 15, 2020

(30) Foreign Application Priority Data

Apr. 9, 2019    (JP) .............................. JP2019-074064

(51) Int. Cl.
*F03D 13/25*    (2016.01)
*B63B 21/50*    (2006.01)
(Continued)

(52) U.S. Cl.
CPC .............. *F03D 13/25* (2016.05); *B63B 21/50* (2013.01); *B63B 35/44* (2013.01); *B63B 1/107* (2013.01);
(Continued)

(58) Field of Classification Search
CPC ......... F03D 13/25; B63B 21/50; B63B 35/44; B63B 1/107; B63B 2035/442;
(Continued)

(56) References Cited

U.S. PATENT DOCUMENTS 9,597,781 B2 *    3/2017  Ozu ........................ B25B 11/02
2011/0309622 A1 *  12/2011 Wakasa ................ F03D 7/0296
                                                    290/44
(Continued)

FOREIGN PATENT DOCUMENTS

EP    0 945 338    9/1999
EP    2 905 217    8/2015
(Continued)

OTHER PUBLICATIONS

Extended European Search Report dated Sep. 14, 2020 in corresponding European Patent Application No. 20156106.5.
(Continued)

*Primary Examiner* — Shafiq Mian
(74) *Attorney, Agent, or Firm* — Wenderoth, Lind & Ponack, L.L.P.

(57) ABSTRACT

A wind turbine offshore installation method of installing a wind turbine using a semi-submersible type floating substructure includes: a step of towing the semi-submersible type floating substructure on which the wind turbine is erected to an installation target site on a sea; and a step of coupling the wind turbine and a spar type floating substructure for supporting the wind turbine on the sea at the installation target site to install the wind turbine on the sea.

9 Claims, 13 Drawing Sheets

(51) Int. Cl.
  *B63B 35/44* (2006.01)
  *B63B 1/10* (2006.01)
(52) U.S. Cl.
  CPC ... *B63B 2035/442* (2013.01); *B63B 2035/446* (2013.01); *F05B 2240/93* (2013.01); *F05B 2240/95* (2013.01); *F05B 2240/96* (2013.01)
(58) Field of Classification Search
  CPC ........... B63B 2035/446; F05B 2240/93; F05B 2240/95; F05B 2240/96
  See application file for complete search history.

(56) References Cited

U.S. PATENT DOCUMENTS

| | | | |
|---|---|---|---|
| 2012/0183359 A1* | 7/2012 | Nordstrom | B63B 21/50 114/265 |
| 2014/0322996 A1* | 10/2014 | Nakamura | F03B 3/00 416/85 |
| 2016/0230746 A1* | 8/2016 | Dagher | F03D 7/043 |
| 2019/0071830 A1* | 3/2019 | Lindblade | E02B 17/027 |

FOREIGN PATENT DOCUMENTS

| | | |
|---|---|---|
| JP | 52-97606 | 9/2013 |
| JP | 2016-531804 | 10/2016 |
| JP | 2017-14940 | 1/2017 |
| WO | 2013/117796 | 8/2013 |

OTHER PUBLICATIONS

Office Action dated Nov. 30, 2020 in corresponding TW Application No. 109100549.

Office Action dated Nov. 8, 2021 in corresponding EP Application No. 20156106.5.

* cited by examiner

SEMI-SUBMERSIBLE TYPE FLOATING SUBSTRUCTURE AND WIND TURBINE OFFSHORE INSTALLATION METHOD USING SEMI-SUBMERSIBLE TYPE FLOATING SUBSTRUCTURE

TECHNICAL FIELD

This disclosure relates to a semi-submersible type floating substructure and a wind turbine offshore installation method using the semi-submersible type floating substructure.

BACKGROUND

Various offshore wind turbines with wind power generation facilities (hereinafter called wind turbines) installed on floating substructures and various methods of installing the offshore wind turbines have conventionally been developed. For example, according to a method disclosed in patent document 1, constituting members forming corresponding parts of a wind turbine are transported to an installation target site in the offing and what is called a spar type floating substructure as a cylindrical floating substructure is towed to the installation target site. Then, the constituting members of the wind turbine are assembled sequentially onto the spar type floating substructure at the installation target site, thereby installing the wind turbine on a sea.

CITATION LIST

Patent Literature

Patent Document 1: WO 2013/117796

SUMMARY

For offshore installation of a wind turbine using a method such as the foregoing method disclosed in patent document 1, as a ship for installation with a large crane is necessary for offshore assembly of the wind turbine, expensive charterage is required.

Additionally, as offshore workload or work manpower increases, climate conditions and hydrographic conditions become more influential. Further, consuming long hours in offshore work entails further cost. In this way, unfavorable issues are caused.

In view of the foregoing circumstances, at least one embodiment of this disclosure is intended to reduce offshore workload resulting from offshore installation of a wind turbine.

(1) A wind turbine offshore installation method of installing a wind turbine using a semi-submersible type floating substructure according to at least one embodiment of this disclosure includes:

a step of towing the semi-submersible type floating substructure on which the wind turbine is erected to an installation target site on a sea; and a step of coupling the wind turbine and a spar type floating substructure for supporting the wind turbine on the sea at the installation target site to install the wind turbine on the sea.

The spar type floating substructure, which is a cylindrical floating substructure, allows cost reduction in manufacturing the floating substructure itself compared to what is called the semi-submersible type floating substructure configured by connecting a plurality of columns. However, the spar type floating substructure is given a long length in a longitudinal direction in order to ensure stability on the sea. Thus, the spar type floating substructure cannot be arranged in an upright state in a place other than the offing where a sufficient water depth is ensured. Regarding the semi-submersible type floating substructure, stability on the sea can be ensured by ensuring a larger area in the water in a horizontal direction than the spar type floating substructure, so that the semi-submersible type floating substructure can be used for supporting the wind turbine on the sea even in a region of a relatively shallow water depth (in a region along a quay, for example). If the semi-submersible type floating substructure is to be installed individually as a floating substructure for supporting the offshore wind turbine, however, the semi-submersible type floating substructure entails higher cost than the spar type floating substructure.

In this regard, according to the foregoing method (1), the wind turbine in the erected state assembled in advance on the semi-submersible type floating substructure in a region of a shallow water depth (along the quay, for example) is towed to the offshore installation target site. This eliminates the need to assemble the wind turbine itself at the installation target site. At the installation target site, the wind turbine can be installed on the sea only by coupling the wind turbine assembled in advance and the spar type floating substructure. This achieves significant reduction in offshore workload and working hours resulting from offshore installation of the wind turbine, compared to the conventional method by which constituting members forming corresponding parts of the wind turbine are transported to the installation target site in the offing, the spar type floating substructure is towed to the installation target site, and then the constituting members of the wind turbine are assembled sequentially onto the spar type floating substructure at the installation target site, for example. Further, the spar type floating substructure less costly as a floating substructure for supporting the individual offshore wind turbine than the semi-submersible type floating substructure is usable to achieve significant reduction in cost involved in installation of the offshore wind turbine.

(2) According to some embodiments, in the foregoing method (1), the step of coupling the wind turbine and the spar type floating substructure may include floating the spar type floating substructure in an upright state from below the semi-submersible type floating substructure in such a manner as to pass through a penetration part penetrating the semi-submersible type floating substructure vertically.

According to the foregoing method (2), the spar type floating substructure is floated in the upright state through the penetration part from below the wind turbine supported on the semi-submersible type floating substructure and placed in advance in the erected state. This allows work of coupling the wind turbine and the spar type floating substructure to be done while the wind turbine is kept supported in the erected state on the semi-submersible type floating substructure. As a result, work manpower resulting from the work of coupling between the wind turbine and the spar type floating substructure on the sea can be minimized.

(3) According to some embodiments, in the foregoing method (1) or (2), the step of coupling the wind turbine and the spar type floating substructure may include coupling the spar type floating substructure and the wind turbine by flange coupling, or by inserting one of a tower of the wind turbine and the spar type floating substructure into the other.

According to the foregoing method (3), the wind turbine and the spar type floating substructure can be coupled by flange coupling, or by what is called male/female coupling of inserting one of the tower of the wind turbine and the spar type floating substructure into the other. This makes it possible to enjoy the advantage described in (1) or (2) in the simple method without following complicated steps.

(4) According to some embodiments, in the foregoing method (2) or (3), the step of towing the semi-submersible type floating substructure may include towing the semi-submersible type floating substructure and the wind turbine to the installation target site while a lower portion of a tower of the wind turbine is supported on a support part provided at the semi-submersible type floating substructure along an edge of the penetration part, and the step of coupling the wind turbine and the spar type floating substructure may include coupling the spar type floating substructure and the lower portion of the tower supported on the support part while the spar type floating substructure is floating in the upright state through the penetration part of the semi-submersible type floating substructure.

According to the foregoing method (4), the wind turbine can be installed on the sea by coupling the lower portion of the tower and the spar type floating substructure while the lower portion of the tower is supported on the support part provided at the semi-submersible type floating substructure along the edge of the penetration part penetrating the semi-submersible type floating substructure vertically and while the spar type floating substructure is floating in the upright state through the penetration part. This makes it possible to enjoy the advantage described in (2) or (3).

(5) According to some embodiments, in any one of the foregoing methods (2) to (4), the step of coupling the wind turbine and the spar type floating substructure may include locating the spar type floating substructure below the penetration part using a thruster provided at the spar type floating substructure or a winch provided at the semi-submersible type floating substructure, or by towing the semi-submersible type floating substructure.

According to the foregoing method (5), using the thruster provided at the spar type floating substructure or the winch provided at the semi-submersible type floating substructure, or towing the semi-submersible type floating substructure allows the semi-submersible type floating substructure and the wind turbine to move relative to the spar type floating substructure in a plan view to locate the spar type floating substructure below the penetration part. This makes it possible to enjoy the advantage described in any one of (2) to (4).

(6) According to some embodiments, in any one of the foregoing methods (2) to (5), the step of floating the spar type floating substructure in such a manner as to pass the spar type floating substructure through the penetration part may include floating a tapered upper end portion of the spar type floating substructure in the penetration part.

According to the foregoing method (6), forming the upper end portion of the spar type floating substructure to be floated in the penetration part of the semi-submersible type floating substructure into the tapered shape allows the spar type floating substructure to be floated easily in the penetration part, compared to floating in the absence of a tapered shape at the upper end portion. Forming the upper end portion of the spar type floating substructure into the tapered shape can simplify work of coupling the wind turbine and the spar type floating substructure by inserting the upper end portion of the spar type floating substructure into the lower portion of the tower of the wind turbine as a continuation of a series of works of floating the spar type floating substructure in the penetration part.

(7) According to some embodiments, in any one of the foregoing methods (1) to (6), the wind turbine offshore installation method may further include:

a step of releasing coupling between the wind turbine and the semi-submersible type floating substructure after the wind turbine and the spar type floating substructure are coupled;

a step of separating the wind turbine after being released from the coupling to the semi-submersible type floating substructure and the spar type floating substructure from the semi-submersible type floating substructure through a communication path in a penetration part formed in a floating substructure body of the semi-submersible type floating substructure so as to communicate with waters surrounding the floating substructure body; and a step of towing the semi-submersible type floating substructure after being released from the coupling to the wind turbine to remove the semi-submersible type floating substructure from the installation target site.

According to the foregoing method (7), the wind turbine coupled to the spar type floating substructure and then released from the coupling to the semi-submersible type floating substructure can be installed on the sea by separating the wind turbine and the spar type floating substructure together from the semi-submersible type floating substructure through the communication path in the penetration part. Then, the semi-submersible type floating substructure separated from the wind turbine is removed from the installation target site to become reusable repeatedly for installation of different offshore wind turbines, for example. This method reduces offshore workload for installation of a plurality of offshore wind turbines, for example, making it possible to achieve both reduction in construction time and reduction in cost for offshore wind turbine installation.

(8) According to some embodiments, in any one of the foregoing methods (1) to (7), the wind turbine offshore installation method may further include:

a step of erecting the wind turbine on the semi-submersible type floating substructure along a quay.

According to the foregoing method (8), the wind turbine can be installed on the semi-submersible type floating substructure using a crane, for example, installed on the quay (namely, on land). This allows installation of the wind turbine on the semi-submersible type floating substructure at low cost while ensuring work stability, compared to installation of the wind turbine on the semi-submersible type floating substructure using a large crane arranged on the semi-submersible type floating substructure or on a ship for installation, for example.

The semi-submersible type floating substructure arranged along the quay may be anchored in a state of being floated on a water surface, for example. Alternatively, if a water depth is shallow and if the semi-submersible type floating substructure includes ballast water quantity adjusting means usable for adjusting a waterline of the semi-submersible type floating substructure, the semi-submersible type floating substructure may be arranged along the quay while touching a sea bottom.

(9) According to some embodiments, in any one of the foregoing methods (1) to (8), the wind turbine offshore installation method may further include:

a step of towing the spar type floating substructure to the installation target site.

According to the foregoing method (9), in addition to the wind turbine supported in the erected state on the semi-submersible type floating substructure, the spar type floating substructure for supporting the wind turbine on the sea is towed to the installation target site and the spar type floating substructure and the wind turbine are coupled at the installation target site. This makes it possible to enjoy the advantage described in any one of (1) to (8).

(10) According to some embodiments, in any one of the foregoing methods (1) to (9), the wind turbine offshore installation method may further include:

a step of anchoring the spar type floating substructure at a sea bottom.

According to the foregoing method (10), the wind turbine supported on the spar type floating substructure can be anchored stably at the offshore installation target site.

The step of anchoring the spar type floating substructure at the sea bottom may be performed either before or after coupling between the wind turbine supported in the erected state on the semi-submersible type floating substructure and the spar type floating substructure, or may be performed either before or after release of the wind turbine coupled to the spar type floating substructure at the installation target site from the coupling to the semi-submersible type floating substructure.

(11) A semi-submersible type floating substructure according to at least one embodiment of this disclosure is a semi-submersible type floating substructure used for installing a wind turbine on a sea including:

a floating substructure body floating on a water surface; and a support part provided at the floating substructure body and configured to be coupled to a lower portion of a tower of the wind turbine, wherein the floating substructure body includes a penetration part penetrating the floating substructure body vertically and extending to an outer edge of the floating substructure body in a plan view, and the support part is provided along an edge of the penetration part.

According to the foregoing configuration (11), the lower portion of the tower of the wind turbine is coupled to the support part provided at the semi-submersible type floating substructure used for installing the wind turbine on the sea. The support part is provided along the edge of the penetration part penetrating the floating substructure body of the semi-submersible type floating substructure vertically and extending to the outer edge of the floating substructure body in a plan view. As a result, work of coupling the wind turbine and the spar type floating substructure can be done easily by floating the spar type floating substructure for supporting the wind turbine on the sea from below the penetration part, for example. In this way, the wind turbine can be towed to the offshore installation target site while being erected on the semi-submersible type floating substructure and can be coupled easily to the spar type floating substructure at the installation target site. This makes it possible to reduce offshore workload significantly resulting from offshore installation of the wind turbine, compared to the conventional installation method of bringing parts of a wind turbine and a floating substructure to the installation target site and assembling the wind turbine sequentially onto the floating substructure on the sea, for example.

(12) According to some embodiments, in the foregoing configuration (11), wall surfaces forming the penetration part and facing each other may be at a distance equal to or greater than an outer diameter of a spar type floating substructure for supporting the wind turbine on the sea.

According to the foregoing configuration (12), the spar type floating substructure for supporting the wind turbine on the sea is allowed to pass through the penetration part of the semi-submersible type floating substructure. This allows the wind turbine and the spar type floating substructure to be separated from the semi-submersible type floating substructure through the penetration part after the spar type floating substructure and the wind turbine are coupled. More specifically, the wind turbine can be installed on the sea at the offshore installation target site by coupling the wind turbine and the spar type floating substructure while the wind turbine is supported on the support part of the semi-submersible type floating substructure, and then separating the wind turbine and the spar type floating substructure together from the semi-submersible type floating substructure through the penetration part. As a result, while offshore workload resulting from offshore installation of the wind turbine is reduced, the spar type floating substructure becomes available instead of the semi-submersible type floating substructure costly as a floating substructure for offshore installation of the wind turbine, thereby allowing reduction in cost involved in offshore installation of the wind turbine.

(13) According to some embodiments, in the foregoing configuration (11) or (12), the floating substructure body may include:

a plurality of columns each formed into a columnar shape and separated in a horizontal direction;

a lower hull connecting the plurality of columns; and a pump usable for pouring ballast water into the columns or the lower hull or ejecting the ballast water from the columns or the lower hull.

According to the foregoing configuration (13), by the use of the semi-submersible type floating substructure with the floating substructure body including the plurality of columns and the lower hull connecting the plurality of columns while the columns are separated in the horizontal direction and configured to make a ballast water quantity adjustable, it becomes possible to enjoy the advantage described in either (11) or (12).

(14) According to some embodiments, in the foregoing configuration (13), the support part may be located at a position on the floating substructure body corresponding to a centroid of a virtual polygon with vertices defined by the respective columns in a plan view.

If the wind turbine is supported in the erected state on the semi-submersible type floating substructure, in addition to swings caused by waves, swings caused by wind become more influential than in a case of placing the wind turbine in a horizontally oriented state on the semi-submersible type floating substructure. In this regard, in the foregoing configuration (14), the wind turbine is supported at a position corresponding to the centroid of the floating substructure body in a plan view. This achieves a balanced configuration in terms of force of restoration from swings in multiple directions. In this way, the stability of the semi-submersible type floating substructure and the wind turbine supported on the semi-submersible type floating substructure can be improved during towing on the sea.

(15) According to some embodiments, in any one of the foregoing configurations (11) to (14), the semi-submersible type floating substructure may further include:

a winch provided on the floating substructure body and usable for feeding and lifting an anchoring tool through the penetration part.

According to the foregoing configuration (15), the presence of the winch usable for feeding and lifting the anchoring tool through the penetration part allows guidance work of guiding the spar type floating substructure into the penetration part to be done easily and readily, for example. This achieves reduction in offshore workload resulting from offshore installation of the wind turbine. Using the winch further makes it possible to implement work of anchoring the spar type floating substructure at a sea bottom easily and readily.

At least one embodiment of this disclosure allows reduction in offshore workload resulting from offshore installation of a wind turbine.

BRIEF DESCRIPTION OF DRAWINGS

FIG. 4 includes views showing the detail of part (A) of FIG. 1.

FIG. 5 includes views showing the detail of part (B) of FIG. 1.

FIG. 6 includes views showing the detail of part (C) of FIG. 1.

FIG. 9 includes views showing how the spar type floating substructure and the wind turbine already coupled to the spar type floating substructure are separated from the semi-submersible type floating substructure according to one embodiment.

FIG. 11 includes partial enlarged views showing a part XI indicated by dashed lines in FIG. 8 in detail.

FIG. 13 includes views showing exemplary configurations of the semi-submersible type floating substructure according to different embodiments.

DETAILED DESCRIPTION

Embodiments of this disclosure will now be described in detail with reference to the accompanying drawings. However, the scope of this disclosure is not limited to the embodiments described below. It is intended that dimensions, materials, shapes, relative positions and the like of components described in the embodiments shall be interpreted as illustrative only and not limitative of the scope of this disclosure.

A wind turbine offshore installation method according to one embodiment of this disclosure will be described first.

Figure 1:
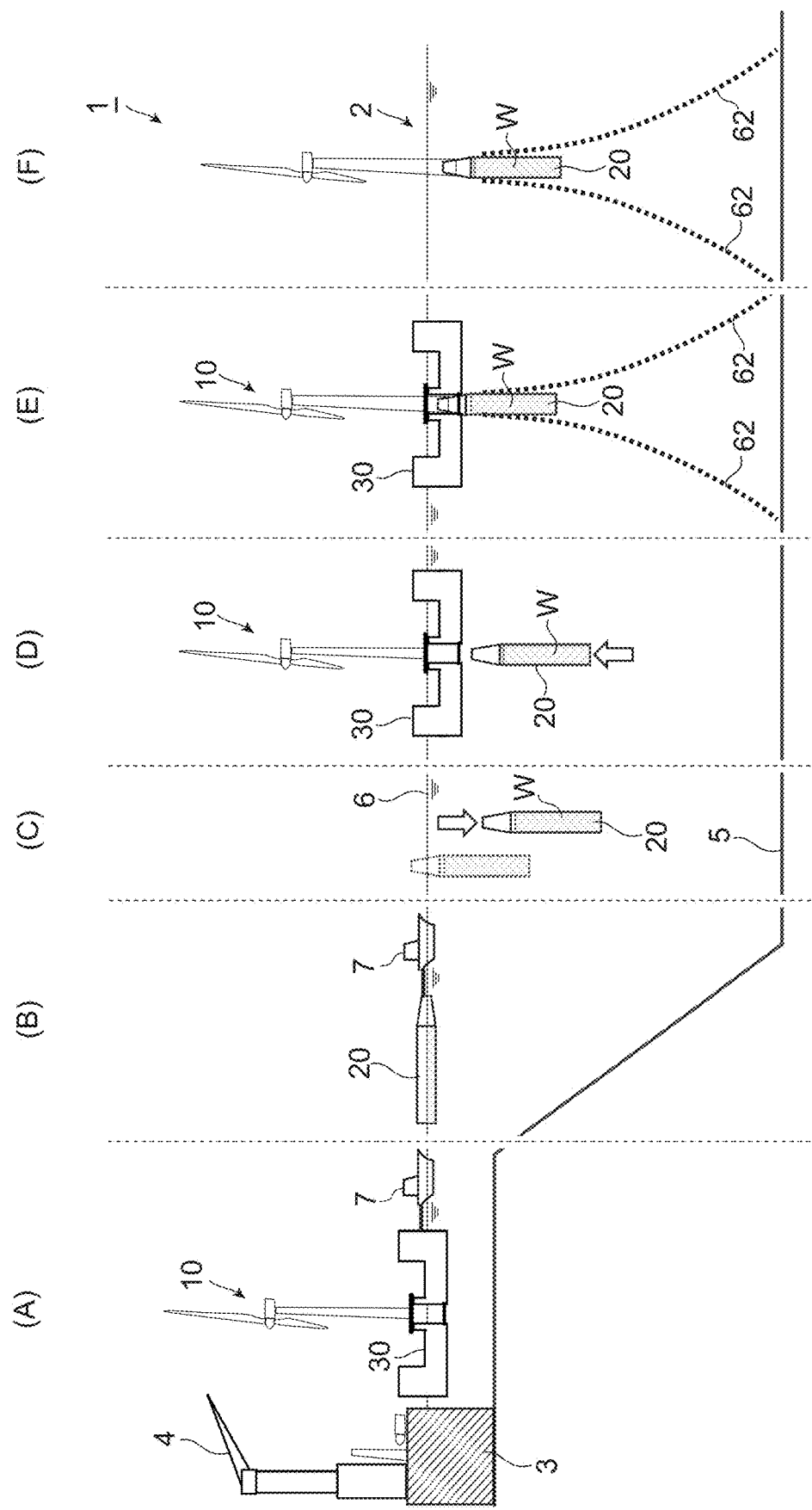
FIG. 1 includes schematic views showing a wind turbine offshore installation method according to one embodiment of this disclosure.
Figure 2:
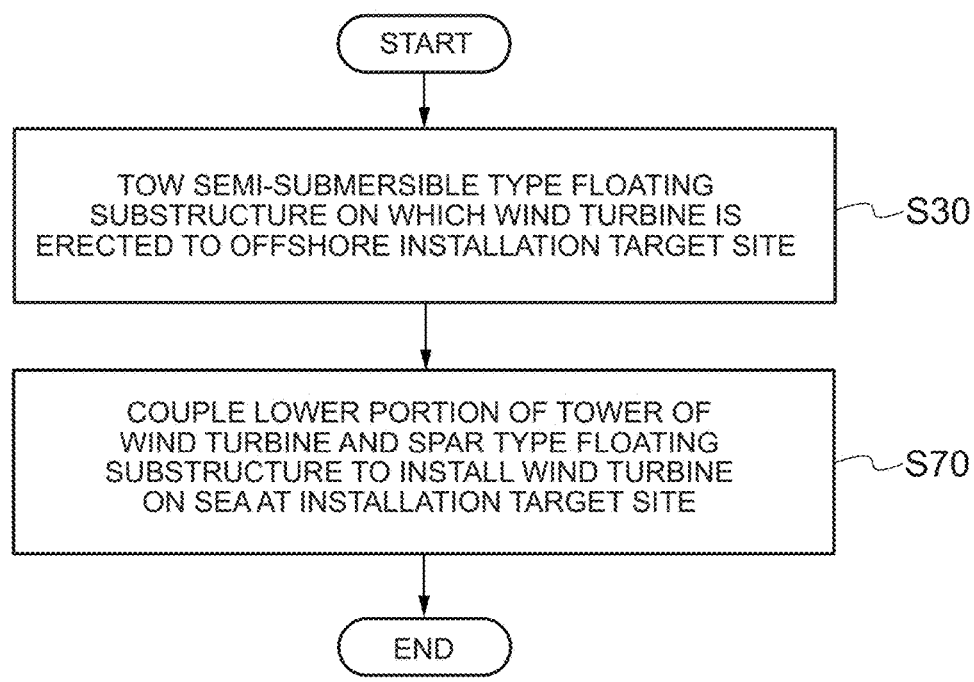
FIG. 2 is a flowchart schematically showing the wind turbine offshore installation method according to one embodiment.

FIG. 1 includes views schematically showing the wind turbine offshore installation method according to one embodiment of this disclosure. FIG. 2 is a flowchart schematically showing the wind turbine offshore installation method according to one embodiment.

As shown in FIGS. 1 and 2, the wind turbine offshore installation method using a semi-submersible type floating substructure according to at least one embodiment of this disclosure includes: a step of towing a semi-submersible type floating substructure 30 on which a wind turbine 10 is erected to an installation target site 2 on the sea (see parts (A) and (B) of FIG. 1, and FIG. 2: step S30); and a step of coupling the wind turbine 10 and a spar type floating substructure 20 for supporting the wind turbine 10 on the sea at the installation target site 2 to install the wind turbine 10 on the sea (more specifically, at the foregoing installation target site 2) (see parts (C) to (F) of FIG. 1, and FIG. 2: step S70).

The semi-submersible type floating substructure 30 is a structure in which a buoyant body (lower hull 34 described later, for example) used in a submerged state in the water in order to avoid influence of waves and a deck part exposed from the water are connected through a hollow column (column 33 described later, for example), and is a semi-underwater type or semi-submersible type floating substructure. The semi-submersible type floating substructure 30 has an advantage of being more stable on the water over general ships and can be towed onto a sea stably with the wind turbine 10 installed on the semi-submersible type floating substructure 30. The semi-submersible type floating substructure 30 may include a pump 35 as a ballast water quantity adjuster in order to allow adjustment of a ballast water quantity inside the semi-submersible type floating substructure 30 and adjustment of a waterline level.

The spar type floating substructure 20 is a practically cylindrical floating substructure having a longitudinal direction, and is a floating substructure to be used while being arranged in a vertical direction in the water with a barycenter at one end of the longitudinal direction (lower end) located at a lower position.

A towing ship 7 is used for towing of the foregoing semi-submersible type floating substructure 30 or spar type floating substructure 20. For example, a ship for construction such as a tugboat is applicable to the towing ship 7. The spar type floating substructure 20 may include a pump 25 as a ballast water quantity adjuster in order to allow adjustment of a ballast water quantity inside the spar type floating substructure 20 and adjustment of a waterline level.

In this disclosure, a region along a quay 3 means a region within a range in which constituting members of the wind turbine 10 can be transported from the quay 3 onto the semi-submersible type floating substructure 30 arranged in a position close to or contacting the quay 3 using a crane 4 arranged on the quay 3 (namely, on land) or the wind turbine 10 can be assembled on this semi-submersible type floating substructure 30.

An offshore region or a region on a sea means a region belonging to an offing region away from the quay 3 and having a water depth (100 m or more, for example) sufficient for the spar type floating substructure 20 described in this disclosure to be arranged in an upright state.

The installation target site 2 is a region as a part of an offing region away from the quay 3 and in which the wind turbine 10 (or offshore wind turbine 1) of this disclosure is to be installed.

The spar type floating substructure 20, which is a cylindrical floating substructure, allows cost reduction in manufacturing the floating substructure itself compared to what is called the semi-submersible type floating substructure 30 configured by connecting a plurality of columns 33. However, the spar type floating substructure 20 is given a long length (several tens of meters, for example) in the longitudinal direction in order to ensure stability on the sea. Thus, the spar type floating substructure 20 cannot be arranged in an upright state in a place other than the offing where a sufficient water depth is ensured. Regarding the semi-submersible type floating substructure 30, stability on the sea can be ensured by ensuring a larger area in the water in a horizontal direction than the spar type floating substructure 20, so that the semi-submersible type floating substructure 30 can be used for supporting the wind turbine 10 on the sea even in a region of a relatively shallow water depth (in a region along a quay, for example). If the semi-submersible type floating substructure 30 is to be installed individually as a floating substructure for supporting the offshore wind turbine 10, however, the semi-submersible type floating substructure 30 entails higher cost than the spar type floating substructure 20.

In this regard, according to the foregoing method, the wind turbine 10 in the erected state assembled in advance on the semi-submersible type floating substructure 30 in a region of a shallow water depth (along the quay 3, for example) is towed to the offshore installation target site 2. This eliminates the need to assemble the wind turbine 10 itself at the installation target site 2. At the installation target site 2, the wind turbine 10 can be installed on the sea only by coupling the wind turbine 10 assembled in advance and the spar type floating substructure 20. This achieves significant reduction in offshore workload and working hours resulting from offshore installation of the wind turbine 10, compared to the conventional method by which constituting members forming corresponding parts of the wind turbine 10 are transported to the installation target site 2 in the offing, the spar type floating substructure 20 is towed to the installation target site 2, and then the constituting members of the wind turbine 10 are assembled sequentially onto the spar type floating substructure 20 at the installation target site 2, for example. Further, the spar type floating substructure 20 less costly as a floating substructure for supporting the individual offshore wind turbine 10 than the semi-submersible type floating substructure 30 is usable to achieve significant reduction in cost involved in installation of the offshore wind turbine 10.

The foregoing method allows installation of the offshore wind turbine 10 at the installation target site 2 in the offing without using a large crane.

The wind turbine offshore installation method according to one embodiment of this disclosure will be described in more detail.

Figure 3:
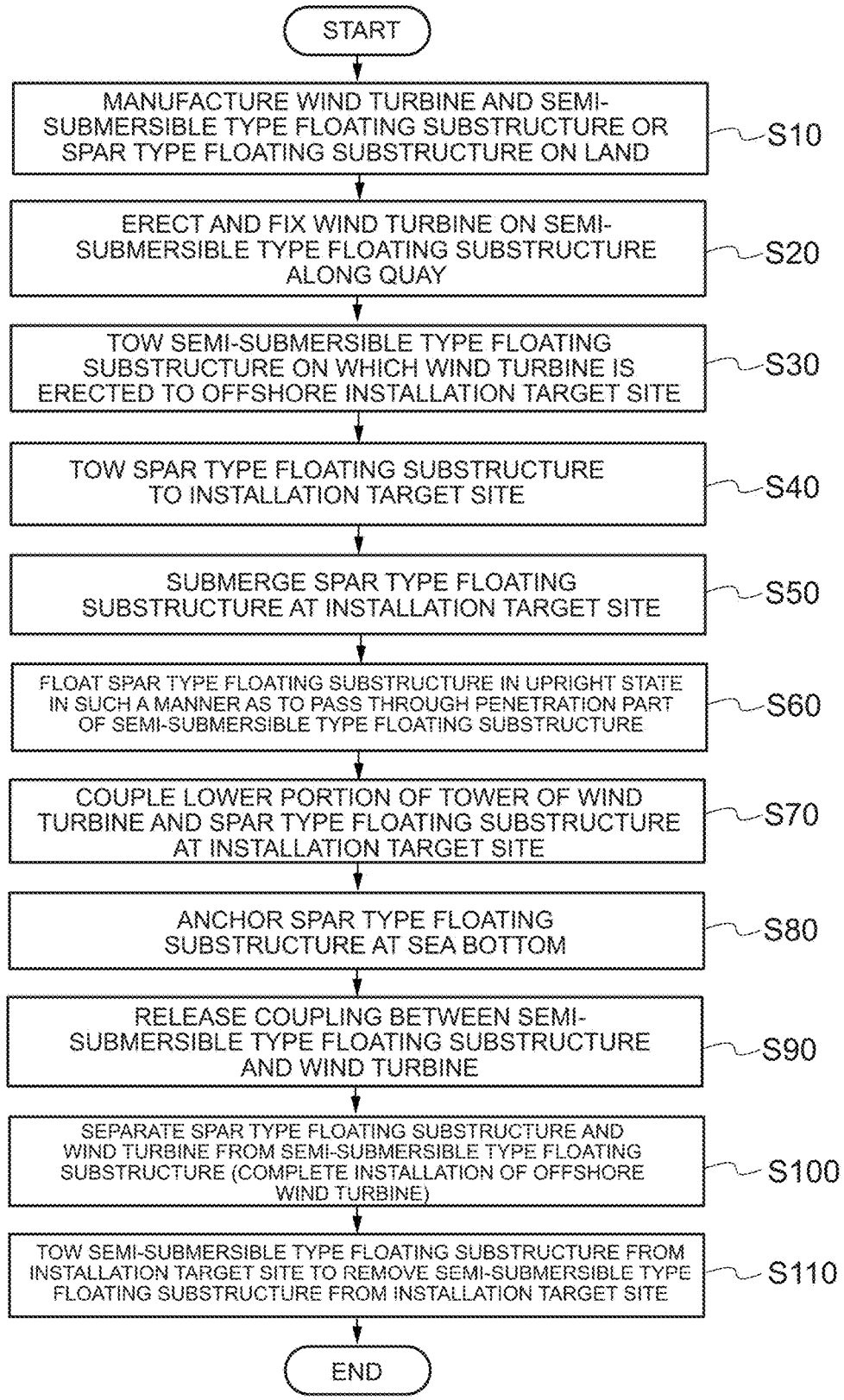
FIG. 3 is a flowchart showing the wind turbine offshore installation method according to one embodiment in detail.
Figure 4A:
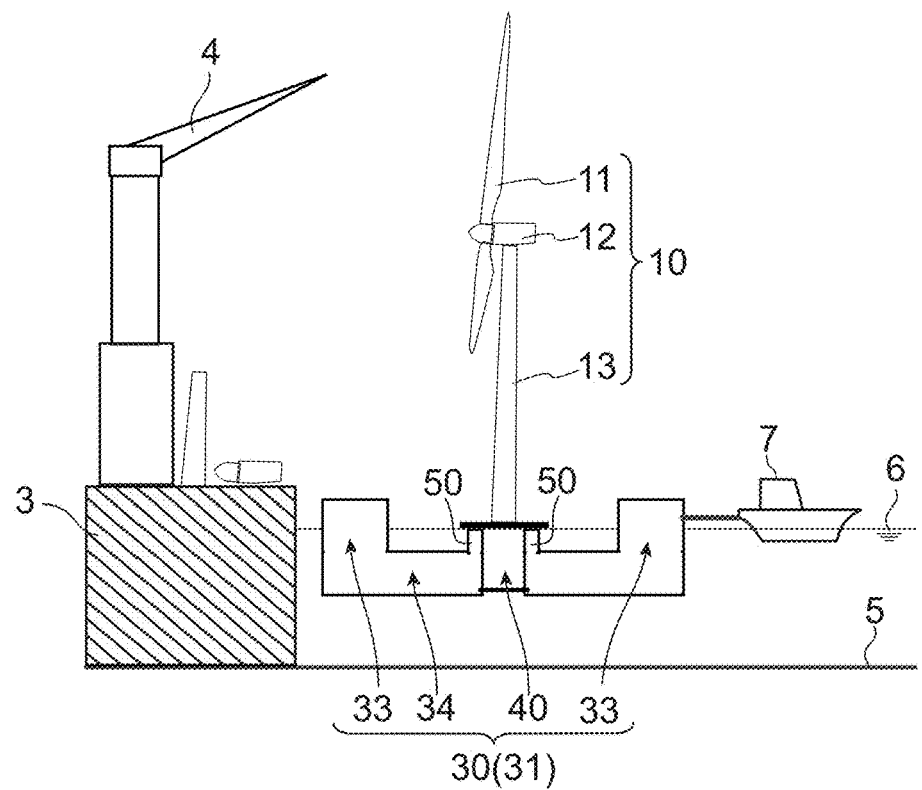
FIG. 4A shows work done along a quay according to one embodiment.
Figure 4B:
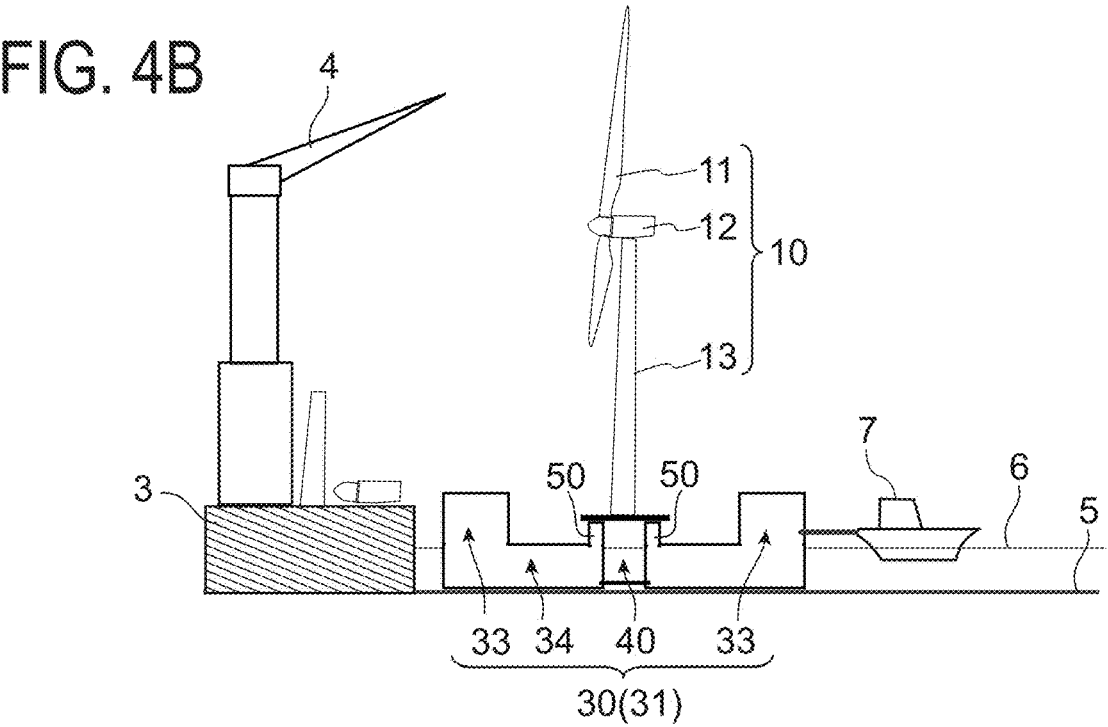
FIG. 4B shows work done along a quay according to a different embodiment.

FIG. 3 is a flowchart showing the wind turbine offshore installation method according to one embodiment in detail. FIG. 4 includes views showing the detail of part (A) of FIG. 1: FIG. 4A shows work done along a quay according to one embodiment; and FIG. 4B shows work done along a quay according to a different embodiment.

According to some embodiments, as illustrated in a non-limitative manner in part (A) of FIG. 1 and FIGS. 3, 4A, and 4B, for example, in any one of the foregoing methods, the wind turbine offshore installation method may further include a step of erecting the wind turbine 10 on the semi-submersible type floating substructure 30 along the quay 3 (step S20).

More specifically, after each part of the wind turbine 10 is manufactured on land (FIG. 3: step S10), for example, the constituting members of the wind turbine 10 are transported onto the semi-submersible type floating substructure 30 using the crane 4 arranged on the quay 3, and the wind turbine 10 is erected and fixed on the semi-submersible type floating substructure 30 in step S20. At this time, a lower portion of a tower 13 and a support part 50 of the semi-submersible type floating substructure 30 (described later) are coupled.

In step S10 described above, in addition to manufacturing each constituting part of the wind turbine 10, the semi-submersible type floating substructure 30 may be manufactured on land or the spar type floating substructure 20 may be manufactured on land, for example. Namely, the wind turbine 10, the semi-submersible type floating substructure 30, and the spar type floating substructure 20 may be manufactured in advance in different places or by different business facilities, or may be manufactured in advance in the same place or by the same business facility.

As described above, the method of erecting the wind turbine 10 on the semi-submersible type floating substructure 30 along the quay 3 allows installation of the wind turbine 10 on the semi-submersible type floating substructure 30 using the crane 4, for example, installed on the quay 3 (namely, on land). This allows installation of the wind turbine 10 on the semi-submersible type floating substructure 30 at low cost while ensuring work stability, compared to installation of the wind turbine 10 on the semi-submersible type floating substructure 30 using a large crane arranged on the semi-submersible type floating substructure 30 or on a ship for installation, for example.

In step S10, the wind turbine 10 may be assembled onto the semi-submersible type floating substructure 30 with the semi-submersible type floating substructure 30 floated on a water surface 6 along the quay 3 as illustrated in a non-limitative manner in part (A) of FIG. 1 and FIG. 4A, for example, or with the semi-submersible type floating substructure 30 touching a sea bottom 5 on condition that a water depth is shallow (less than 12 m, for example) and in the presence of ballast water quantity adjusting means provided at the semi-submersible type floating substructure 30 and usable for adjusting a waterline of the semi-submersible type floating substructure 30 as illustrated in a non-limitative manner in FIG. 4B.

Figure 5A:
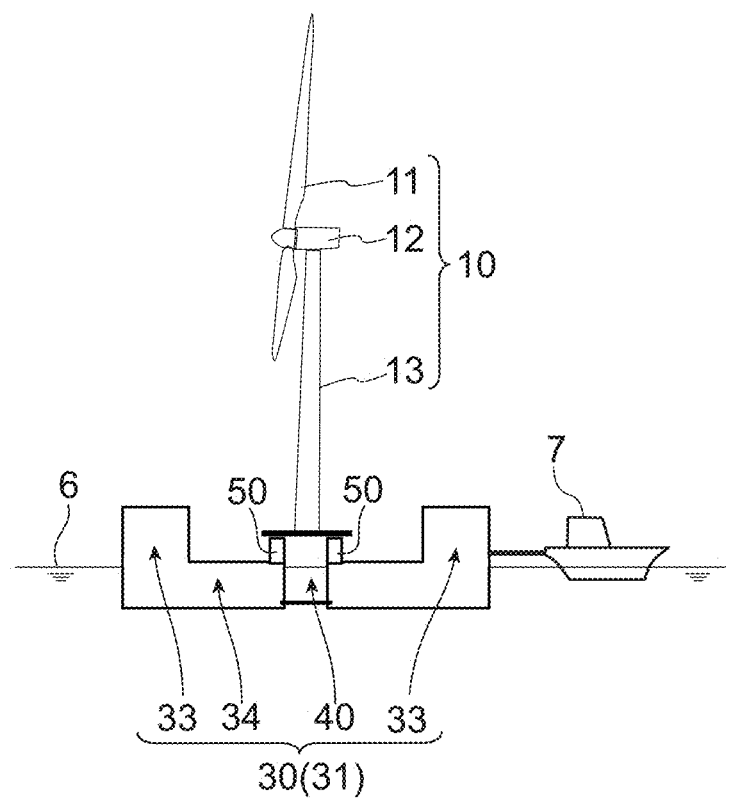
FIG. 5A shows how a semi-submersible type floating substructure on which a wind turbine in the erected state is installed is towed to the offing.
Figure 5B:
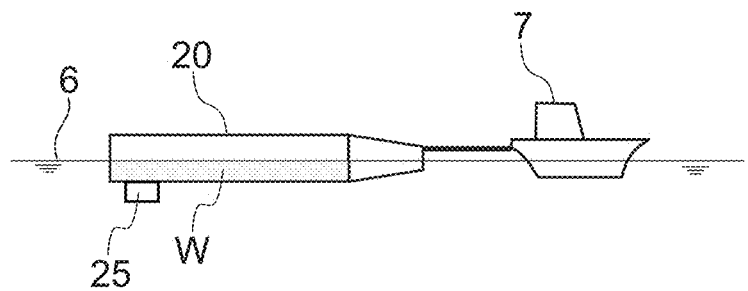
FIG. 5B shows how a spar type floating substructure is towed to the offing.

FIG. 5 includes views showing the detail of part (B) of FIG. 1: FIG. 5A shows how the semi-submersible type floating substructure on which the wind turbine in an erected state is installed is towed to the offing; and FIG. 5B shows how the spar type floating substructure is towed to the offing.

According to some embodiments, as illustrated in a non-limitative manner in part (B) of FIG. 1, and FIGS. 2, 3, 5A, and 5B, for example, in any one of the foregoing methods, the wind turbine offshore installation method may further include a step of towing the spar type floating substructure 20 to the installation target site 2 (FIG. 3: step S40).

Namely, according to some embodiments, in addition to the step of towing the wind turbine 10 installed in the erected state on the semi-submersible type floating substructure 30 to the installation target site 2 in the offing (step S30, see FIG. 4A), the spar type floating substructure 20 may be towed to the installation target site 2.

As described above, in addition to the wind turbine 10 supported in the erected state on the semi-submersible type floating substructure 30, the spar type floating substructure 20 for supporting the wind turbine 10 on the sea is towed to the installation target site 2 and the spar type floating substructure 20 and the wind turbine 10 are coupled at the installation target site 2. This makes it possible to enjoy advantage described in connection with any of the embodiments of this disclosure.

Figure 6A:
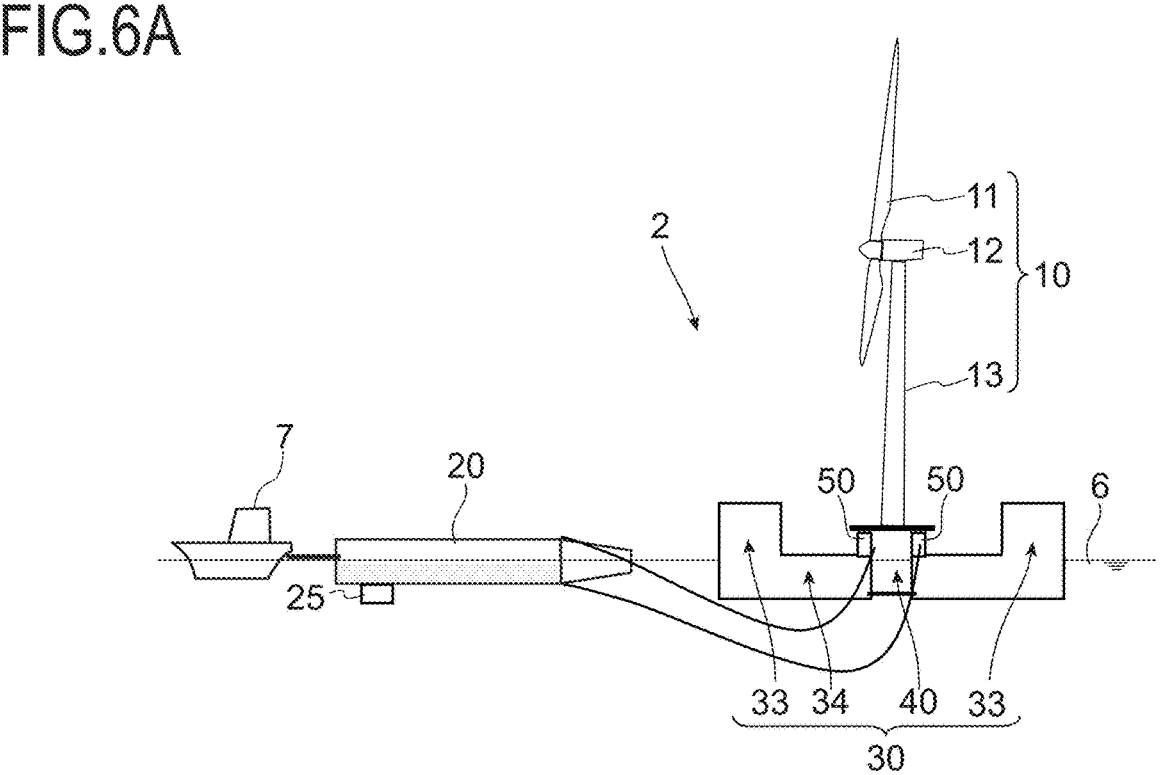
FIG. 6A shows how the semi-submersible type floating substructure and the spar type floating substructure are connected with a wire at an installation target site.
Figure 6B:
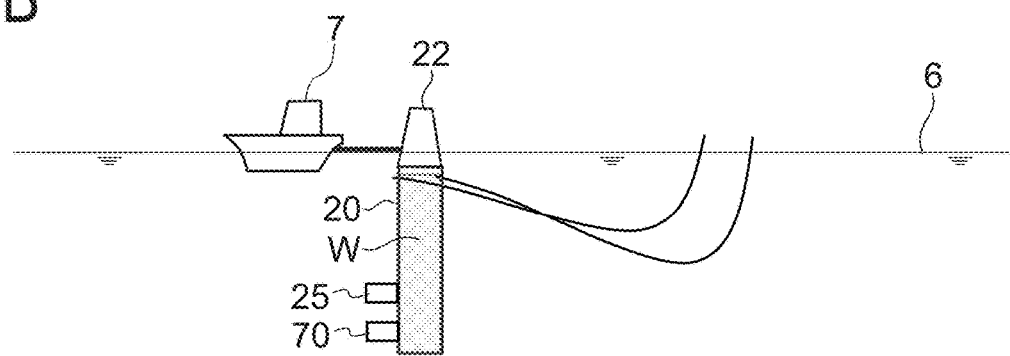
FIG. 6B shows how the spar type floating substructure is placed in an upright state near a water surface.
Figure 6C:
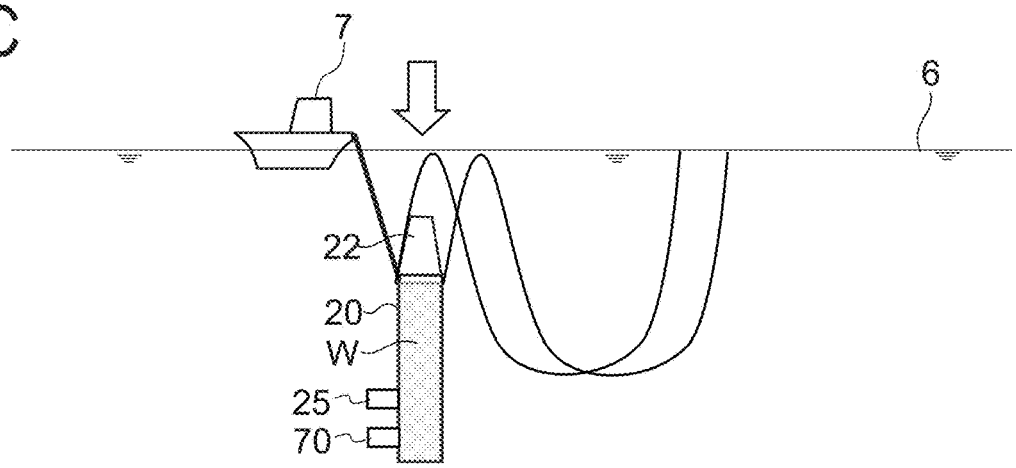
FIG. 6C shows how the spar type floating substructure in the upright state is submerged in the water.

FIG. 6 includes views showing the detail of part (C) of FIG. 1: FIG. 6A shows how the semi-submersible type floating substructure and the spar type floating substructure are connected with a wire at the installation target site; FIG. 6B shows how the spar type floating substructure is placed in the upright state near the water surface; and FIG. 6C shows how the spar type floating substructure in the upright state is submerged in the water.

According to some embodiments, as illustrated in a non-limitative manner in FIGS. 6A to 6C, a step of coupling the spar type floating substructure 20 and the semi-submersible type floating substructure 30 towed to the installation target site 2 in the offing with a wire may be provided. In this case, the wire may be fed from a winch 60 provided to at least one of the spar type floating substructure 20 and the semi-submersible type floating substructure 30.

Figure 7:
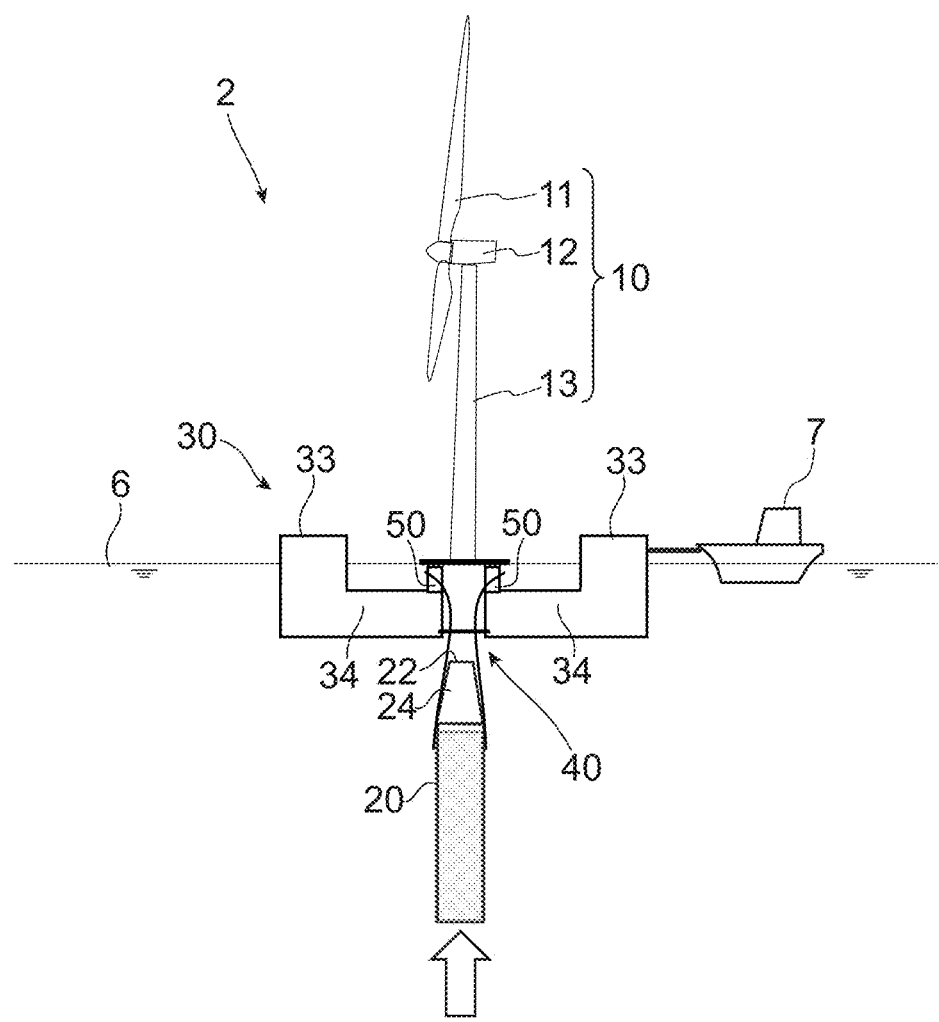
FIG. 7 shows the detail of part (D) of FIG. 1 and shows how the spar type floating substructure is floated in the upright state through a penetration part of the semi-submersible type floating substructure.
Figure 8:
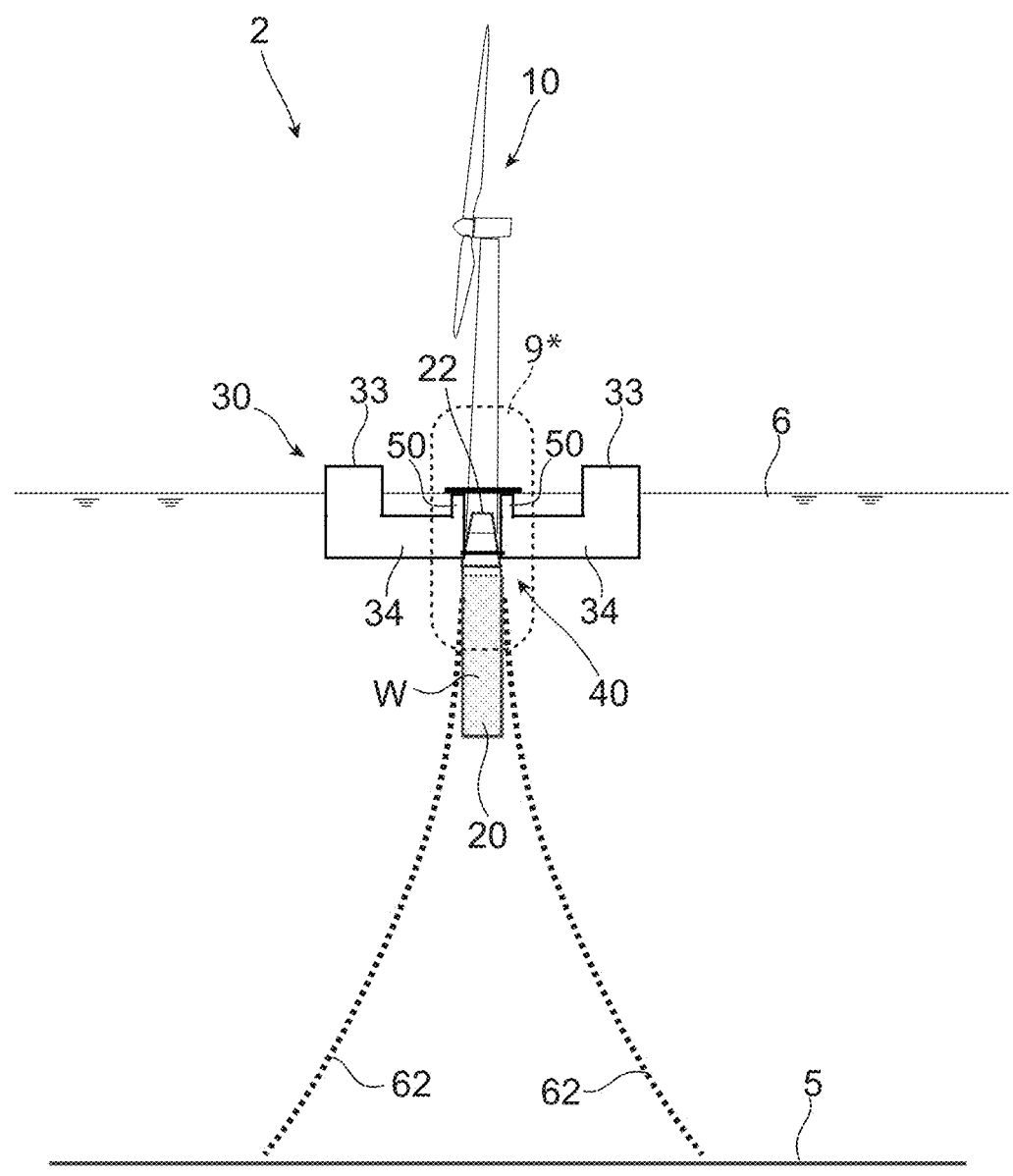
FIG. 8 shows the detail of part (E) of FIG. 1 and shows how a lower portion of a tower of the wind turbine and the spar type floating substructure are coupled and how the spar type floating substructure is anchored at a sea bottom using an anchoring tool.

FIG. 7 shows the detail of part (D) of FIG. 1 and shows how the spar type floating substructure is floated in the upright state through a penetration part of the semi-submersible type floating substructure. FIG. 8 shows the detail of part (E) of FIG. 1 and shows how the lower portion of the tower of the wind turbine and the spar type floating substructure are coupled and how the spar type floating substructure is anchored at the sea bottom using an anchoring tool.

According to some embodiments, as illustrated in a non-limitative manner in parts (D) and (E) of FIG. 1 and FIGS. 3, 7, and 8, for example, the step of coupling the wind turbine 10 and the spar type floating substructure 20 in any one of the foregoing methods may include floating the spar type floating substructure 20 in the upright state from below the semi-submersible type floating substructure 30 in such a manner as to pass through a penetration part 40 penetrating the semi-submersible type floating substructure 30 vertically (FIG. 3: step S60).

More specifically, the spar type floating substructure 20 is arranged in the upright state by adjusting a ballast water quantity in the spar type floating substructure 20 towed to the installation target site 2 (see FIG. 6B). Next, the ballast water quantity is adjusted further to submerge the spar type floating substructure 20 in the water (FIG. 3: step S50, see FIG. 6B). At this time, the spar type floating substructure 20 may be submerged after being arranged in the upright state beforehand, or may be arranged in the upright state after being submerged in a horizontally oriented state or an oblique state.

Next, the spar type floating substructure 20 in the upright state is moved from a position below the semi-submersible type floating substructure 30 to a position directly below the wind turbine 10 (see FIG. 7). Then, the ballast water quantity in the spar type floating substructure 20 submerged in the upright state is adjusted to float the spar type floating substructure 20, thereby inserting an apex (upper end portion 22) of the spar type floating substructure 20 into the penetration part 40 and inserting the upper end portion 22 (apex) of the spar type floating substructure 20 into an opening at the lower portion of the tower 13 of the wind turbine 10 (see part (E) of FIG. 1 and FIG. 8).

As described above, the spar type floating substructure 20 is floated in the upright state through the penetration part 40 from below the wind turbine 10 supported on the semi-submersible type floating substructure 30 in the erected state formed in advance. This allows work of coupling the wind turbine 10 and the spar type floating substructure 20 to be done while the wind turbine 10 is kept supported in the erected state on the semi-submersible type floating substructure 30. As a result, work manpower resulting from the work of coupling between the wind turbine 10 and the spar type floating substructure 20 on the sea can be minimized.

According to some embodiments, as illustrated in FIGS. 6B and 6C, for example, the step of coupling the wind turbine 10 and the spar type floating substructure 20 in any one of the foregoing methods may include locating the spar type floating substructure 20 below the penetration part 40 using a thruster 70 provided at the spar type floating substructure 20 or the winch 60 provided at the semi-submersible type floating substructure 30, or by towing the semi-submersible type floating substructure 30. The thruster is generally used as a power unit for moving ships, etc. in a lateral direction (horizontal direction) and is a generic name for propulsive devices used for arrival at a shore or leaving from the shore.

As described above, using the thruster 70 provided at the spar type floating substructure 20 or the winch 60 provided at the semi-submersible type floating substructure 30, or towing the semi-submersible type floating substructure 30 allows the semi-submersible type floating substructure 30, the wind turbine 10, and the spar type floating substructure 20 to move relative to the spar type floating substructure 20 in a plan view to locate the spar type floating substructure 20 below the penetration part 40. Namely, moving the semi-submersible type floating substructure 30, the wind turbine 10, and the spar type floating substructure 20 in the horizontal direction using some type of power realizes arrangement easily and efficiently in which the spar type floating substructure 20 in the upright state overlaps the penetration part 40 of the semi-submersible type floating substructure 30 or the tower of the wind turbine supported on the semi-submersible type floating substructure 30 in a plan view. This makes it possible to enjoy advantage described in connection with any of the foregoing methods.

According to some embodiments, as illustrated in a non-limitative manner in parts (D) and (E) of FIG. 1 and FIGS. 7 and 8, for example, the step of floating the spar type floating substructure 20 in such a manner as to pass the spar type floating substructure 20 through the penetration part 40 in any one of the foregoing methods may include floating the upper end portion 22 having a tapered shape of the spar type floating substructure 20 in the penetration part 40.

Namely, the spar type floating substructure 20 may include a tapered part 24 of a conical shape or a truncated conical shape at the upper end portion 22 when the spar type floating substructure 20 is arranged in the upright state.

As described above, forming the upper end portion 22 of the spar type floating substructure 20 to be floated in the penetration part 40 of the semi-submersible type floating substructure 30 into the tapered shape allows the spar type floating substructure 20 to be floated easily in the penetration part 40, compared to floating in the absence of a tapered shape at the upper end portion 22. Forming the upper end portion 22 of the spar type floating substructure 20 into the tapered shape can simplify work of coupling the wind turbine and the spar type floating substructure 20 by inserting the upper end portion 22 of the spar type floating substructure 20 into the lower portion of the tower 13 of the wind turbine 10 as a continuation of a series of works of floating the spar type floating substructure 20 in the penetration part 40.

Figure 9A:
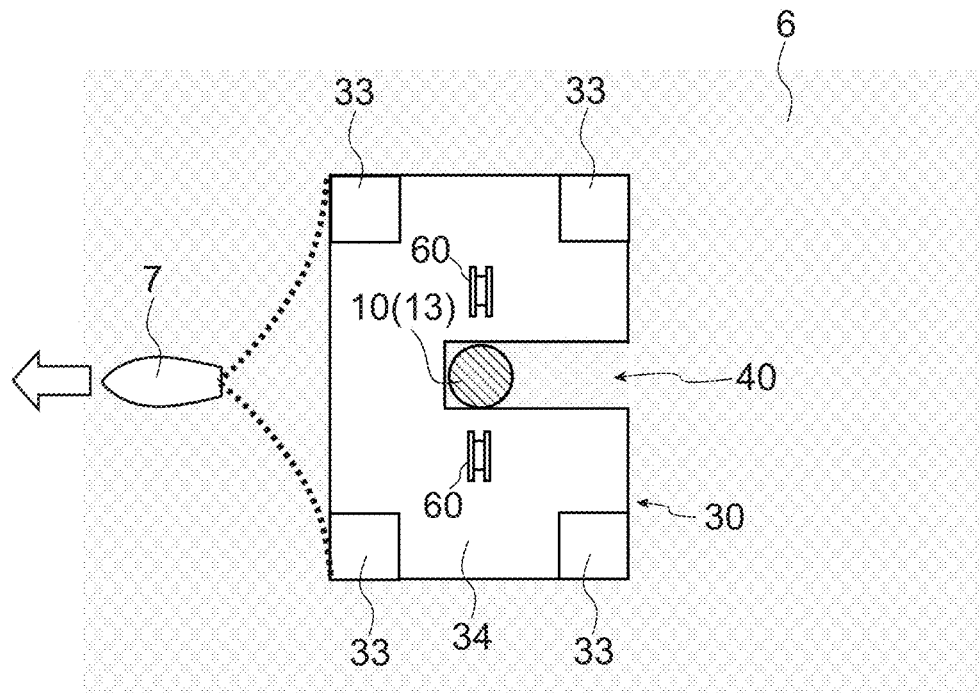
FIG. 9A shows a state before the separation.
Figure 9B:
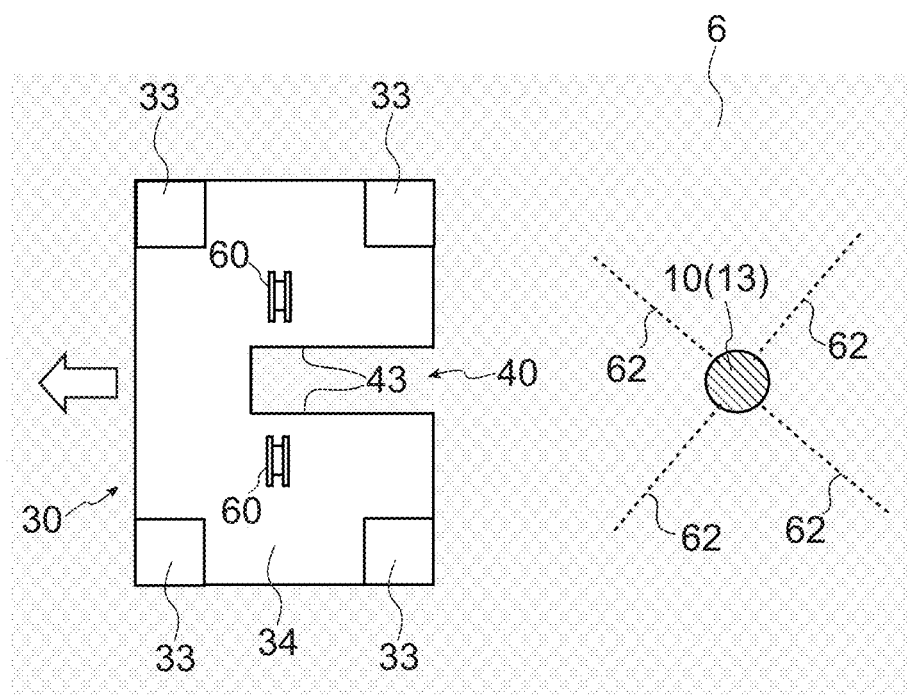
FIG. 9B shows a state after the separation.
Figure 10:
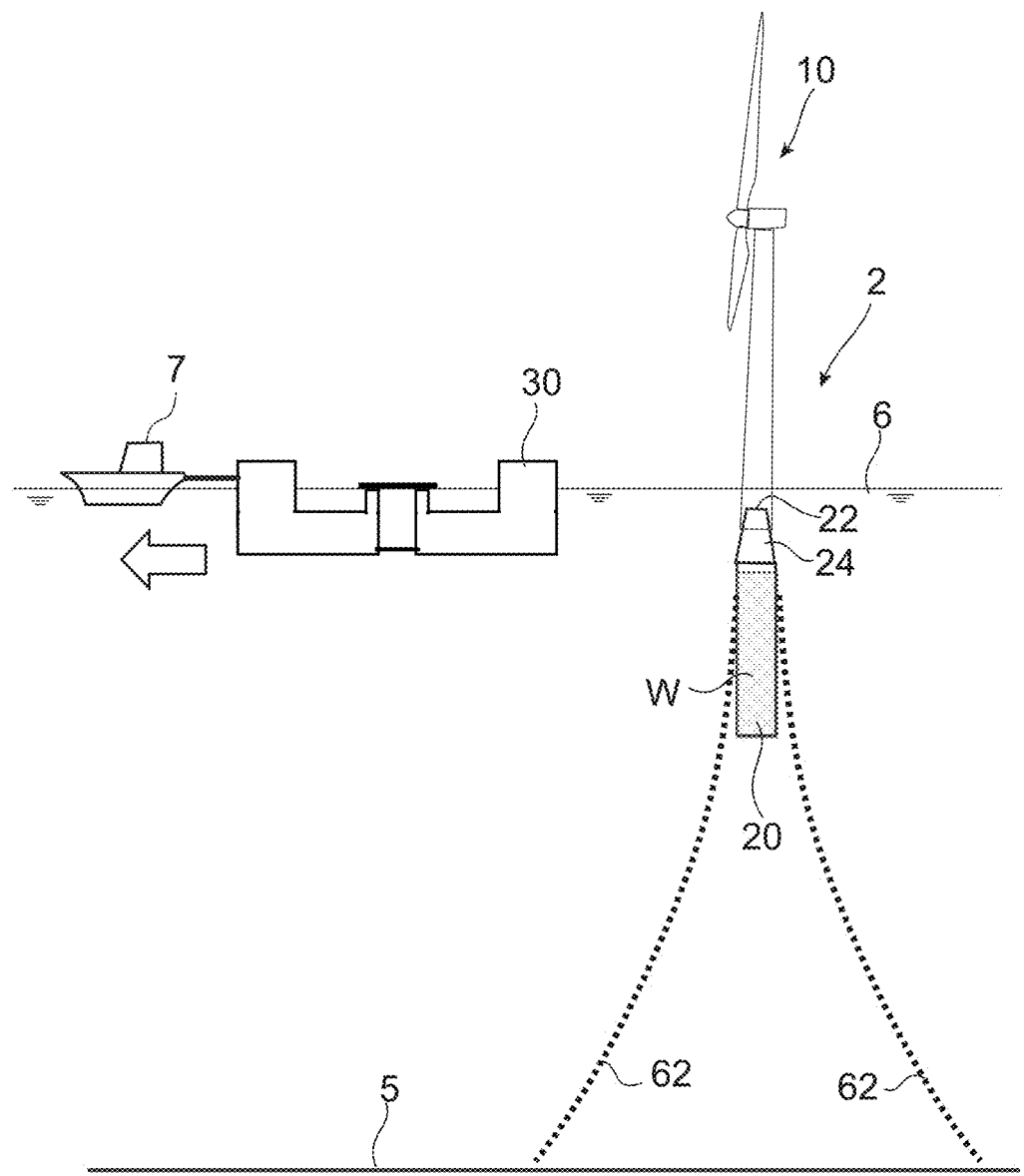
FIG. 10 shows the detail of part (F) of FIG. 1 and shows how the wind turbine (offshore wind turbine) is installed on the sea by being supported on the spar type floating substructure anchored at the sea bottom.

FIG. 9 includes views showing how the spar type floating substructure and the wind turbine already coupled to the spar type floating substructure are separated from the semi-submersible type floating substructure according to one embodiment: FIG. 9A shows a state before the separation; and FIG. 9B shows a state after the separation. FIG. 10 shows the detail of part (F) of FIG. 1 and shows how the wind turbine (offshore wind turbine) is installed on the sea by being supported on the spar type floating substructure anchored at the sea bottom.

According to some embodiments, as illustrated in a non-limitative manner in FIGS. 3, 9A, 9B, and 10, for example, in any one of the foregoing methods, the wind turbine offshore installation method may further include: a step of releasing coupling between the wind turbine 10 and the semi-submersible type floating substructure 30 after the wind turbine 10 and the spar type floating substructure 20 are coupled (FIG. 3: step S90); a step of separating the wind turbine 10 after being released from the coupling to the semi-submersible type floating substructure 30 and the spar type floating substructure 20 from the semi-submersible type floating substructure 30 through the penetration part 40 (communication path) communicating with waters surrounding a floating substructure body 31 of the semi-submersible type floating substructure 30 (FIG. 3: step S100, see FIGS. 9A and 9B); and a step of towing the semi-submersible type floating substructure 30 after being released from the coupling to the wind turbine 10 to remove the semi-submersible type floating substructure 30 from the installation target site 2 (FIG. 3: step S110, see FIG. 10).

In step S90 of releasing the coupling between the wind turbine 10 and the semi-submersible type floating substructure 30, the coupling therebetween may be released by removing a bolt for fastening between a flange part (second flange part 54) at the lower portion of the tower 13 of the wind turbine 10 and the support part 50 of the semi-submersible type floating substructure 30, for example. According to a different embodiment, the coupling between the wind turbine 10 and the semi-submersible type floating substructure 30 may be retained and the semi-submersible type floating substructure 30 may be left unremoved from the installation target site 2 together with the spar type floating substructure 20, for example. In step S100 of separating the wind turbine 10 and the spar type floating substructure 20 coupled to the wind turbine 10 from the semi-submersible type floating substructure 30, at least one of the semi-submersible type floating substructure 30 and the spar type floating substructure 20 may be towed by the towing ship 7 to move the semi-submersible type floating substructure 30 and the spar type floating substructure 20 relatively in opposite directions in a plan view, thereby separating the semi-submersible type floating substructure 30 and the spar type floating substructure 20 from each other.

As a result, the wind turbine 10 coupled to the spar type floating substructure 20 and then released from the coupling to the semi-submersible type floating substructure 30 can be installed on the sea by separating the wind turbine 10 and the spar type floating substructure 20 together from the semi-submersible type floating substructure 30 through the penetration part 40 (communication path). Then, the semi-submersible type floating substructure 30 separated from the wind turbine 10 is removed from the installation target site 2 to become reusable repeatedly for installation of different offshore wind turbines 10, for example. This method reduces offshore workload for installation of a plurality of offshore wind turbines 10, for example, making it possible to achieve both reduction in construction time and reduction in cost for offshore wind turbine installation.

According to some embodiments, as illustrated in a non-limitative manner in parts (E) and (F) of FIG. 1, and FIGS. 8, 9B, and 10, for example, in any one of the foregoing methods, the offshore installation method of installing the wind turbine 10 may further include a step of anchoring the spar type floating substructure 20 at the sea bottom 5.

This method of anchoring the spar type floating substructure 20 at the sea bottom 5 using an anchoring tool 62 allows the wind turbine 10 supported on the spar type floating substructure 20 to be anchored stably at the offshore installation target site 2.

The step of anchoring the spar type floating substructure 20 at the sea bottom 5 (step S80) may be performed either before or after coupling between the wind turbine 10 supported in the erected state on the semi-submersible type floating substructure 30 and the spar type floating substructure 20, or may be performed either before or after release of the wind turbine 10 coupled to the spar type floating substructure 20 at the installation target site 2 from the coupling to the semi-submersible type floating substructure 30.

Figure 11A:
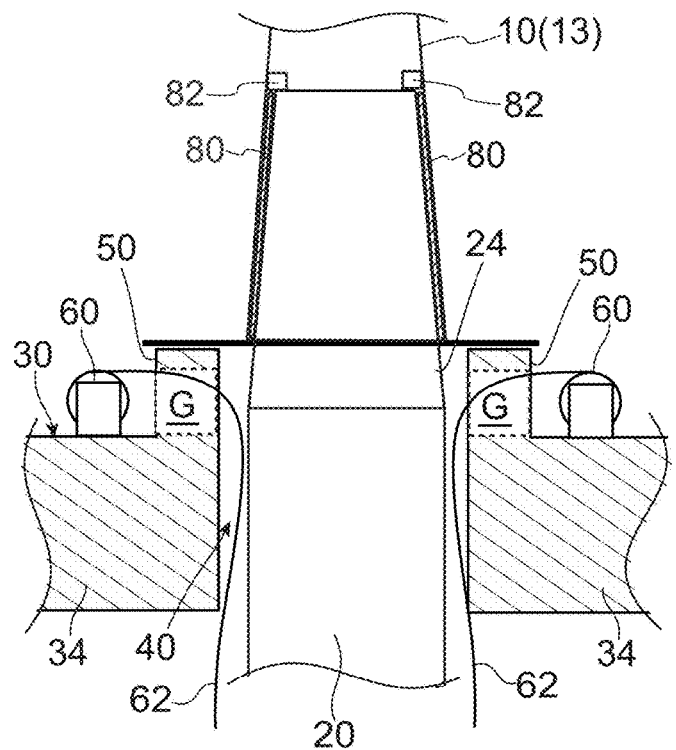
FIG. 11A illustrates how the lower portion of the tower of the wind turbine and the spar type floating substructure are coupled by male/female coupling.
Figure 11B:
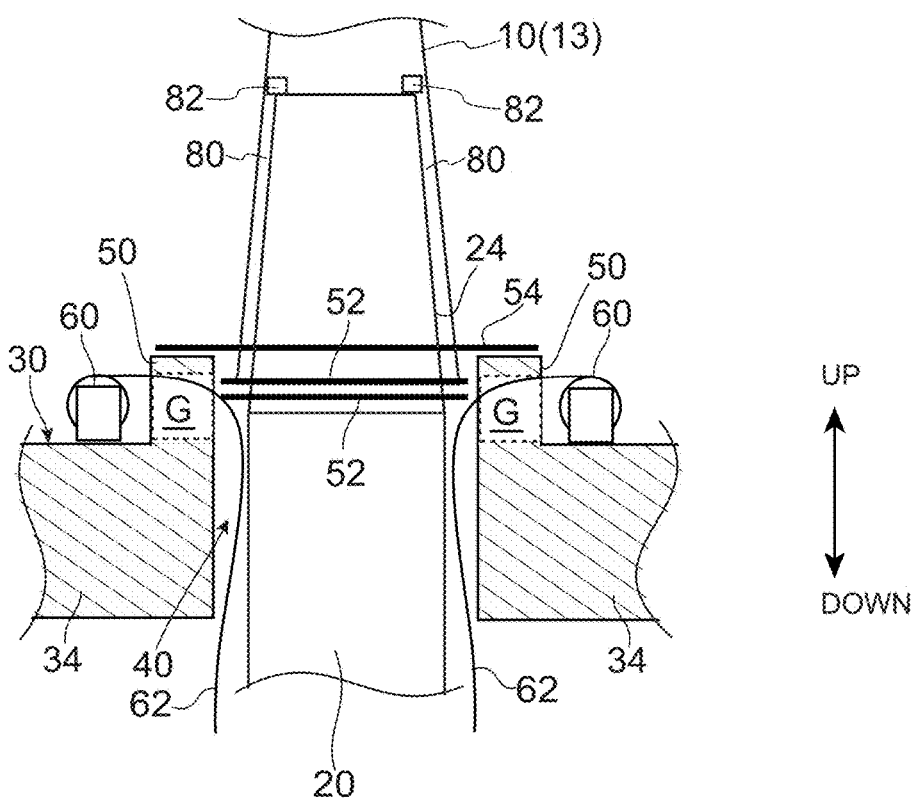
FIG. 11B illustrates how the lower portion of the tower of the wind turbine and the spar type floating substructure are coupled by flange coupling.

FIG. 11 includes partial enlarged views showing a part XI indicated by dashed lines in FIG. 8 in detail; FIG. 11A illustrates how the lower portion of the tower of the wind turbine and the spar type floating substructure are coupled by male/female coupling; and FIG. 11B illustrates how the lower portion of the tower of the wind turbine and the spar type floating substructure are coupled by flange coupling.

According to some embodiments, as illustrated in FIGS. 11A and 11B, for example, the step of coupling the spar type floating substructure 20 and the wind turbine 10 in any one of the foregoing methods may include coupling the spar type floating substructure 20 and the wind turbine 10 by flange coupling, or by what is called male/female coupling of inserting one of the tower 13 of the wind turbine 10 and the spar type floating substructure 20 into the other (see parts (E) and (F) of FIG. 1, and FIGS. 8 and 10).

Figure 12:
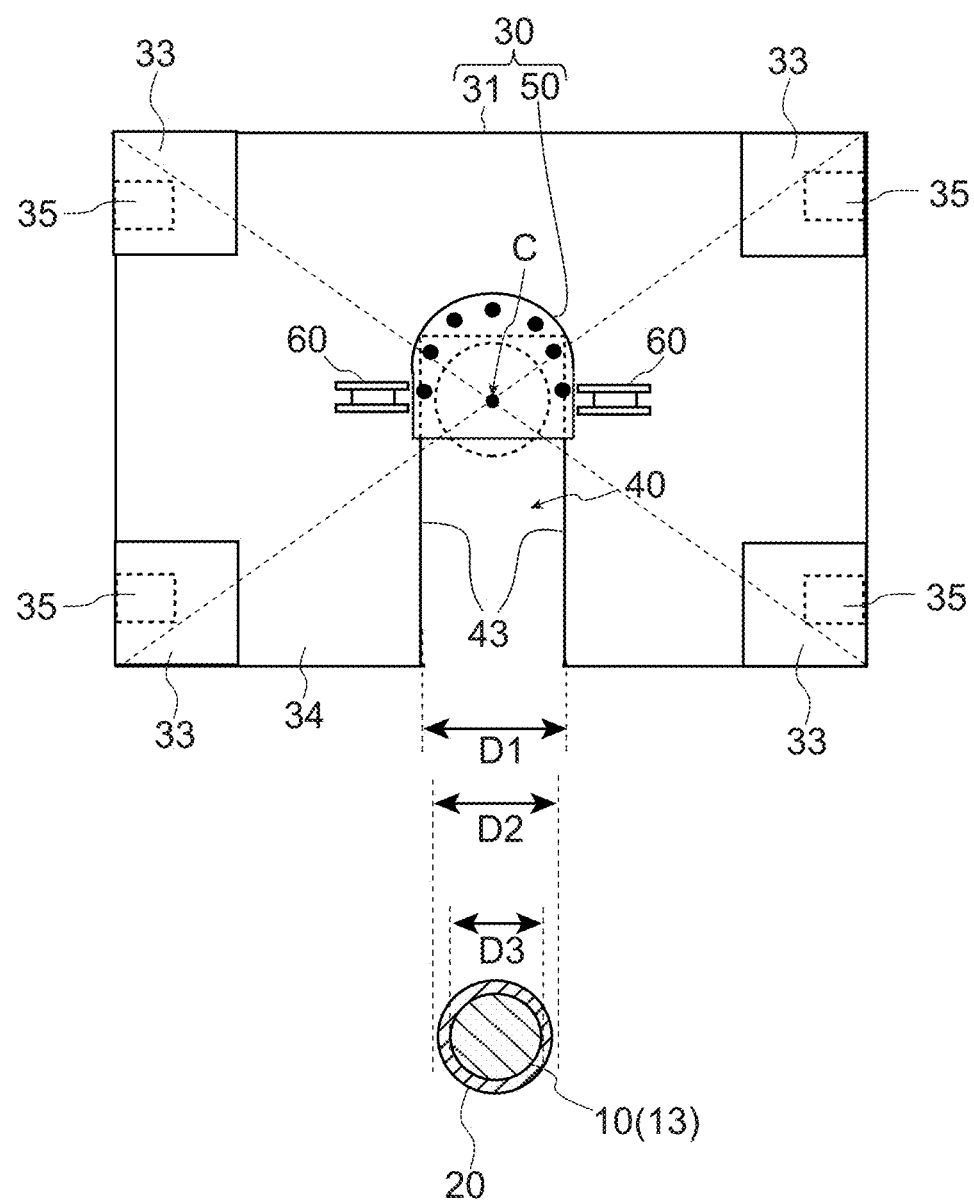
FIG. 12 is a plan view schematically showing an exemplary configuration of the semi-submersible type floating substructure according to one embodiment.

If the wind turbine 10 (lower portion of tower 13) and the spar type floating substructure 20 are coupled by flange coupling, for example, a first flange part 52 provided at the lower portion of the tower 13 for coupling to the spar type floating substructure 20 and a flange part 28 provided at an upper portion of the spar type floating substructure 20 (tapered part 24, for example) for coupling to the tower 13 may be coupled by fastening means such as bolt fastening (see FIGS. 11B and 12).

If the tower 13 and the spar type floating substructure 20 are coupled by male/female coupling, for example, the wind turbine 10 and the spar type floating substructure 20 may be connected adhesively with grout 80 poured between an inner peripheral surface of the lower portion of the tower 13 and the vicinity of the upper end portion 22 of the spar type floating substructure 20 (tapered part 24, for example) (see FIG. 11A, for example).

A stopper 82 for latching the upper end portion 22 (or upper end surface) of the spar type floating substructure 20 may be provided at the inner peripheral surface of the lower portion of the tower 13 and at a height of a predetermined distance from the lower end of the tower 13 (see FIGS. 11A and 11B).

The second flange part 54 for connection to the support part 50 of the semi-submersible type floating substructure 30 may be provided at the lower portion of the tower 13. In the presence of the two flange parts 52 and 54 (the first flange part 52 for connection to the spar type floating substructure 20 and the second flange part 54 for connection to the semi-submersible type floating substructure 30) at the lower portion of the tower 13, the second flange part 54 is arranged at a higher position than the first flange part 52 (in FIG. 11B, above the first flange part 52). The second flange part is formed into a size allowing latch with the support part 50 with a diameter greater than the diameter of the first flange part 52 and greater than the width of the penetration part 40 of the semi-submersible type floating substructure 30 (distance between wall surfaces 43, 43). The first flange part 52 is formed into a size less than the width of the penetration part 40.

As described above, the spar type floating substructure 20 and the wind turbine 10 can be coupled by flange coupling, or by what is called male/female coupling of inserting one of the tower 13 of the wind turbine 10 and the spar type floating substructure 20 into the other. This makes it possible to enjoy advantage described in connection with any of the foregoing embodiments in the simple method without following complicated steps.

FIG. 12 is a plan view schematically showing an exemplary configuration of the semi-submersible type floating substructure according to one embodiment.

According to some embodiments, as illustrated in a non-limitative manner in FIG. 12, for example, in any one of the foregoing methods, the step of towing the semi-submersible type floating substructure 30 may include towing the semi-submersible type floating substructure 30 and the wind turbine 10 to the installation target site 2 while the lower portion of the tower 13 of the wind turbine 10 is supported on the support part 50 provided at the semi-submersible type floating substructure 30 along an edge of the penetration part 40, and the step of coupling the spar type floating substructure 20 and the wind turbine 10 may include coupling the spar type floating substructure 20 and the lower portion of the tower 13 supported on the support part 50 while the spar type floating substructure 20 is floating in the upright state through the penetration part 40 of the semi-submersible type floating substructure 30.

As a result, the wind turbine 10 can be installed on the sea by coupling the lower portion of the tower 13 and the spar type floating substructure 20 while the lower portion of the tower 13 is supported on the support part 50 provided at the semi-submersible type floating substructure 30 along the edge of the penetration part 40 penetrating the semi-submersible type floating substructure 30 vertically and while the spar type floating substructure 20 is floating in the upright state through the penetration part 40. This makes it possible to enjoy advantage described in connection with any of the foregoing methods.

The semi-submersible type floating substructure according to at least one embodiment of this disclosure will be described next.

Figure 13A:
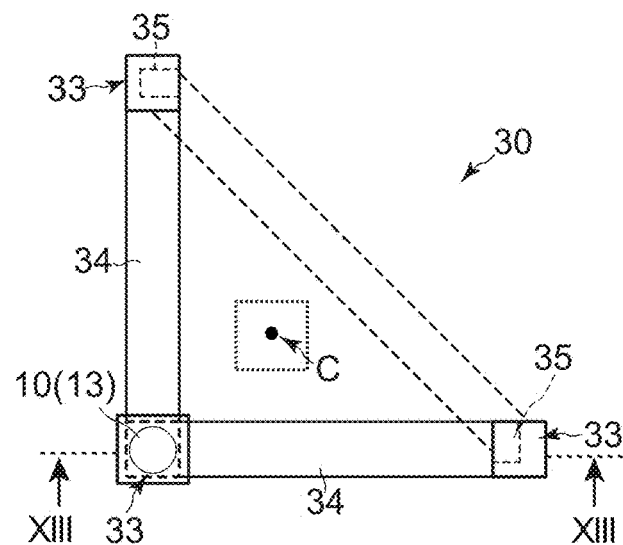
FIG. 13A shows a state in which, in a semi-submersible type floating substructure (triangle) with columns located at respective vertices of an isosceles right-angled triangle in a plan view, a wind turbine is arranged using a penetration part and a support part provided at one of the columns.
Figure 13B:
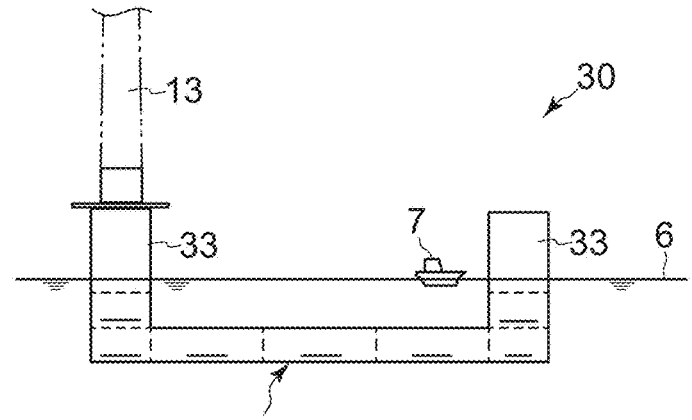
FIG. 13B is a side view taken from a direction indicated by arrows XIII-XIII in FIG. 13A.
Figure 13C:
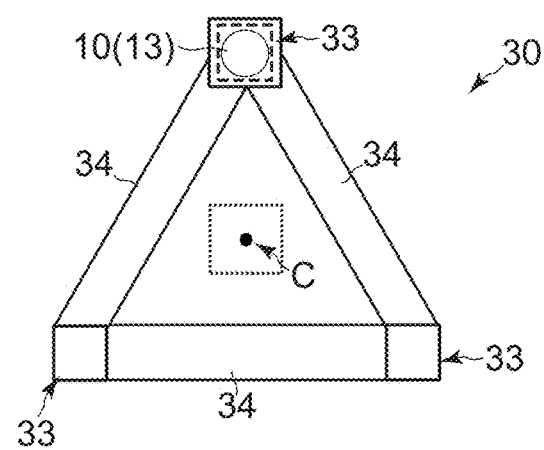
FIG. 13C is a plan view illustrating a semi-submersible type floating substructure (triangle) according to a different embodiment.

FIG. 13 includes views showing exemplary configurations of the semi-submersible type floating substructure according to different embodiments: FIG. 13A shows a state in which, in a semi-submersible type floating substructure (triangle) with columns located at respective vertices of an isosceles right-angled triangle in a plan view, a wind turbine is arranged using a penetration part and a support part provided at one of the columns; FIG. 13B is a side view taken from a direction indicated by arrows XIII-XIII in FIG. 13A; and FIG. 13C is a plan view illustrating a semi-submersible type floating substructure (triangle) according to a different embodiment.

As illustrated in a non-limitative manner in FIGS. 11 to 13, a semi-submersible type floating substructure 30 according to at least one embodiment of this disclosure is a semi-submersible type floating substructure 30 used for installing a wind turbine 10 on the sea including: a floating substructure body 31 floating on a water surface 6; and a support part 50 provided at the floating substructure body 31 and configured to be coupled to a lower portion of a tower 13 of the wind turbine 10.

The floating substructure body 31 includes a penetration part 40 penetrating the floating substructure body 31 vertically and extending to an outer edge 32 of the floating substructure body 31 in a plan view.

The support part 50 is provided along an edge of the penetration part 40.

The support part 50 may be provided at the innermost position of the penetration part 40 (namely, a position inwardly separated by the greatest distance from the outer edge 32 of the semi-submersible type floating substructure 30).

The support part 50 may have a gap G allowing a wire from a winch 60 described later to pass through (see FIGS. 11A and 11B).

In the foregoing configuration, the lower portion of the tower 13 of the wind turbine 10 is coupled to the support part 50 provided at the semi-submersible type floating substructure 30 used for installing the wind turbine 10 on the sea. The support part 50 is provided along the edge of the penetration part 40 penetrating the floating substructure body 31 of the semi-submersible type floating substructure 30 vertically and extending to the outer edge 32 of the floating substructure body 31 in a plan view. As a result, work of coupling the wind turbine 10 and the spar type floating substructure 20 can be done easily by floating the spar type floating substructure 20 for supporting the wind turbine 10 on the sea from below the penetration part 40, for example. In this way, the wind turbine 10 can be towed to the offshore installation target site 2 while being erected on the semi-submersible type floating substructure 30 and can be coupled easily to the spar type floating substructure 20 at the installation target site 2. This makes it possible to reduce offshore workload significantly resulting from offshore installation of the wind turbine 10, compared to the conventional installation method of bringing parts of a wind turbine and a floating substructure to the installation target site 2 and assembling the wind turbine 10 sequentially onto the floating substructure on the sea, for example.

According to some embodiments, in the foregoing configuration, wall surfaces 43 forming the penetration part 40 and facing each other may be at a distance D1 equal to or greater than an outer diameter D2 of the spar type floating substructure 20 for supporting the wind turbine 10 on the sea as illustrated in FIG. 12, for example.

The distance D1 between the wall surfaces 43 may be equal to or greater than an outer diameter D3 of the lower portion of the tower 13 of the wind turbine 10.

By doing so, the spar type floating substructure 20 for supporting the wind turbine 10 on the sea is allowed to pass through the penetration part 40 of the semi-submersible type floating substructure 30. This allows the wind turbine 10 and the spar type floating substructure 20 to be separated from the semi-submersible type floating substructure 30 through the penetration part 40 after the spar type floating substructure 20 and the wind turbine 10 are coupled. More specifically, the wind turbine 10 can be installed on the sea at the offshore installation target site 2 by coupling the wind turbine 10 and the spar type floating substructure 20 while the wind turbine 10 is supported on the support part 50 of the semi-submersible type floating substructure 30, and then separating the wind turbine 10 and the spar type floating substructure 20 together from the semi-submersible type floating substructure 30 through the penetration part 40. As a result, while offshore workload resulting from offshore installation of the wind turbine 10 is reduced, the spar type floating substructure 20 becomes available instead of the semi-submersible type floating substructure 30 costly as a floating substructure for offshore installation of the wind turbine 10, thereby allowing reduction in cost involved in offshore installation of the wind turbine 10.

According to some embodiments, in some of the foregoing configurations, the floating substructure body 31 may include: a plurality of columns 33 each formed into a columnar shape and separated in a horizontal direction; a lower hull 34 connecting the plurality of columns; and a pump 35 usable for pouring ballast water into the columns 33 or the lower hull 34 or ejecting the ballast water from the columns 33 or the lower hull 34 as illustrated in FIG. 12, for example.

Namely, the floating substructure body 31 can be configured in such a manner as to make a waterline height adjustable by adjusting a ballast water quantity in the columns 33 or the lower hull 34.

The respective interiors of the foregoing columns 33 and lower hull 34 are each divided into a plurality of small cells and are configured to allow pouring of water into an arbitrary cell or ejection of the water from an arbitrary cell selectively.

As described above, by the use of the semi-submersible type floating substructure 30 with the floating substructure body 31 including the plurality of columns 33 and the lower hull 34 connecting the plurality of columns 33 while the columns 33 are separated in the horizontal direction and configured to make a ballast water quantity adjustable, it becomes possible to enjoy advantage described in connection with any of the foregoing embodiments of this disclosure.

According to some embodiments, in any of the foregoing configurations, the support part 50 may be located at a position on the floating substructure body 31 corresponding to a centroid C (or barycenter) of a virtual polygon with vertices defined by the respective columns 33 in a plan view as illustrated in a non-limitative manner in FIGS. 12 and 13A to 13C, for example.

If the wind turbine 10 is supported in the erected state on the semi-submersible type floating substructure 30, in addition to swings caused by waves, swings caused by wind become more influential than in a case of placing the wind turbine 10 in a horizontally oriented state on the semi-submersible type floating substructure 30. In this regard, in the foregoing configuration in which the support part 50 is located at the centroid C in a plan view, the wind turbine 10 is supported at a position corresponding to the centroid C of the floating substructure body 31 in a plan view. This achieves a balanced configuration in terms of force of restoration from swings in multiple directions. In this way, the stability of the semi-submersible type floating substructure 30 and the wind turbine 10 supported on the semi-submersible type floating substructure 30 can be improved during towing on the sea.

According to some embodiments, in any of the foregoing configurations, the semi-submersible type floating substructure 30 may further include the winch 60 provided on the floating substructure body 31 and usable for feeding and lifting an anchoring tool 62 through the penetration part 40 as illustrated in FIGS. 9 to 12, for example.

The winch 60 may be arranged at each of opposite sides across the penetration part 40 as viewed in a direction perpendicular to a direction in which the spar type floating substructure 20 is separated.

In the foregoing configuration with the winch 60, the presence of the winch 60 usable for feeding and lifting the anchoring tool 62 through the penetration part 40 allows guidance work of guiding the spar type floating substructure 20 into the penetration part 40 to be done easily and readily, for example. This achieves reduction in offshore workload resulting from offshore installation of the wind turbine 10. Using the winch 60 further makes it possible to implement work of anchoring the spar type floating substructure 20 at the sea bottom easily and readily.

According to some embodiments, as illustrated in FIG. 12, for example, the plurality of columns 33 may include four columns 33 located at respective vertices of a virtual rectangle in a plan view.

In this case, the support part 50 may be located on a point of intersection of diagonal lines of the virtual rectangle with the vertices defined by these respective four columns 33 in a plan view.

With this configuration, the semi-submersible type floating substructure 30 balanced in terms of both stability and cost can be provided.

According to some embodiments, as illustrated in FIGS. 13A to 13C, for example, the plurality of columns 33 may include three columns 33 located at respective vertices of a virtual triangle in a plan view, and the support part 50 may be located on the column 33 arranged at a position corresponding to any one of the vertices of the virtual triangle. As shown in FIG. 13A, for example, if the three columns 33 are arranged in an isosceles right-angled triangular pattern in a plan view, the support part 50 may be located on the middle column 33, namely, on the column 33 at a 90-degree interior angle.

While the configuration described as an example in this disclosure has three columns 33 or four columns 33, these numbers are not the limitative numbers of a plurality of columns 33. As long as buoyant force of supporting the wind turbine 10 on the sea can be achieved and balance can be kept, for example, the number of the columns 33 may be two, or five or more.

At least one of the embodiments of this disclosure allows reduction in offshore workload resulting from offshore installation of the wind turbine 10.

This disclosure is not limited to the foregoing embodiments but includes embodiments devised by making changers to the foregoing embodiments and embodiments devised by combining such embodiments.

The invention claimed is:

1. A wind turbine offshore installation method of installing a wind turbine using a semi-submersible type floating substructure, the method comprising:
    towing the semi-submersible type floating substructure on which the wind turbine is erected to an installation target site on a sea; and
    coupling the wind turbine and a spar type floating substructure for supporting the wind turbine on the sea at the installation target site to install the wind turbine on the sea,
    wherein the coupling of the wind turbine and the spar type floating substructure includes:
        submerging the spar type floating substructure in the sea so as to dispose the spar type floating substructure in an upright state entirely below a bottom of the semi-submersible type floating substructure; and
        floating the spar type floating substructure in the upright state from below the bottom of the semi-submersible type floating substructure so as to vertically pass through a penetration part penetrating the semi-submersible type floating substructure.

2. The wind turbine offshore installation method according to claim 1, wherein
    the coupling of the wind turbine and the spar type floating substructure includes coupling the spar type floating substructure and the wind turbine by flange coupling, or by inserting one of a tower of the wind turbine and the spar type floating substructure into the other.

3. The wind turbine offshore installation method according to claim 1, wherein
    the towing of the semi-submersible type floating substructure includes towing the semi-submersible type floating substructure and the wind turbine to the installation target site while a lower portion of a tower of the wind turbine is supported on a support part provided at the semi-submersible type floating substructure along an edge of the penetration part, and
    the coupling of the wind turbine and the spar type floating substructure includes coupling the spar type floating substructure and the lower portion of the tower supported on the support part while the spar type floating substructure is floating in the upright state through the penetration part of the semi-submersible type floating substructure.

4. The wind turbine offshore installation method according to claim 1, wherein
    the coupling of the wind turbine and the spar type floating substructure includes locating the spar type floating substructure below the penetration part using a thruster provided at the spar type floating substructure or a winch provided at the semi-submersible type floating substructure, or by towing the semi-submersible type floating substructure.

5. The wind turbine offshore installation method according to claim 1, wherein
    the floating of the spar type floating substructure includes floating a tapered upper end portion of the spar type floating substructure in the penetration part.

6. The wind turbine offshore installation method according to claim 1, further comprising:
    releasing coupling between the wind turbine and the semi-submersible type floating substructure after the wind turbine and the spar type floating substructure are coupled;
    after the releasing of the coupling between the wind turbine and the semi-submersible type floating substructure, separating the wind turbine and the spar type floating substructure from the semi-submersible type floating substructure through a communication path in the penetration part formed in a floating substructure body of the semi-submersible type floating substructure so as to communicate with waters surrounding the floating substructure body; and
    towing the semi-submersible type floating substructure after being released from the coupling to the wind turbine to remove the semi-submersible type floating substructure from the installation target site.

7. The wind turbine offshore installation method according to claim 1, further comprising:
    erecting the wind turbine on the semi-submersible type floating substructure along a quay.

8. The wind turbine offshore installation method according to claim 1, further comprising:
    towing the spar type floating substructure to the installation target site.

9. The wind turbine offshore installation method according to claim 1, further comprising:
    anchoring the spar type floating substructure at a sea bottom.

* * * * *